United States Patent [19]
Quisenberry

[11] 3,854,555
[45] Dec. 17, 1974

[54] PEDAL OPERATED SHOE BRAKE FOR JUVENILE BIKE

[75] Inventor: Carter E. Quisenberry, Olney, Ill.

[73] Assignee: AMF Incorporated, White Plains, N.Y.

[22] Filed: Feb. 21, 1974

[21] Appl. No.: 444,286

[52] U.S. Cl. .................................. 188/24, 188/29
[51] Int. Cl. ............................................ B62l 1/04
[58] Field of Search ........... 188/24, 29, 30, 74, 82.1

[56] References Cited
FOREIGN PATENTS OR APPLICATIONS

| 456,684 | 4/1950 | Italy | 188/24 |
| 430,485 | 2/1948 | Italy | 188/24 |
| 768,544 | 8/1934 | France | 188/24 |

Primary Examiner—Trygve M. Blix
Assistant Examiner—Edward R. Kazenske
Attorney, Agent, or Firm—George W. Price; Walter Lewis

[57] ABSTRACT

A shoe brake for the rear wheel of a juvenile bike is pedal operated by a cam wheel on the pedal crank and a connecting link between the cam wheel and brake shoe. When pedalling forward, a spring keeps the brake disengaged, but upon reverse pedalling the spring allows the cam wheel to energize the brake shoe through the connecting link.

1 Claim, 2 Drawing Figures

PATENTED DEC 17 1974

3,854,555

PEDAL OPERATED SHOE BRAKE FOR JUVENILE BIKE

This invention relates to a pedal operated shoe brake for the rear wheel of a juvenile bicycle.

It is an object of this invention to provide a low-cost and simple brake for a juvenile bike intended for off the road or sidewalk use.

Figure 1:
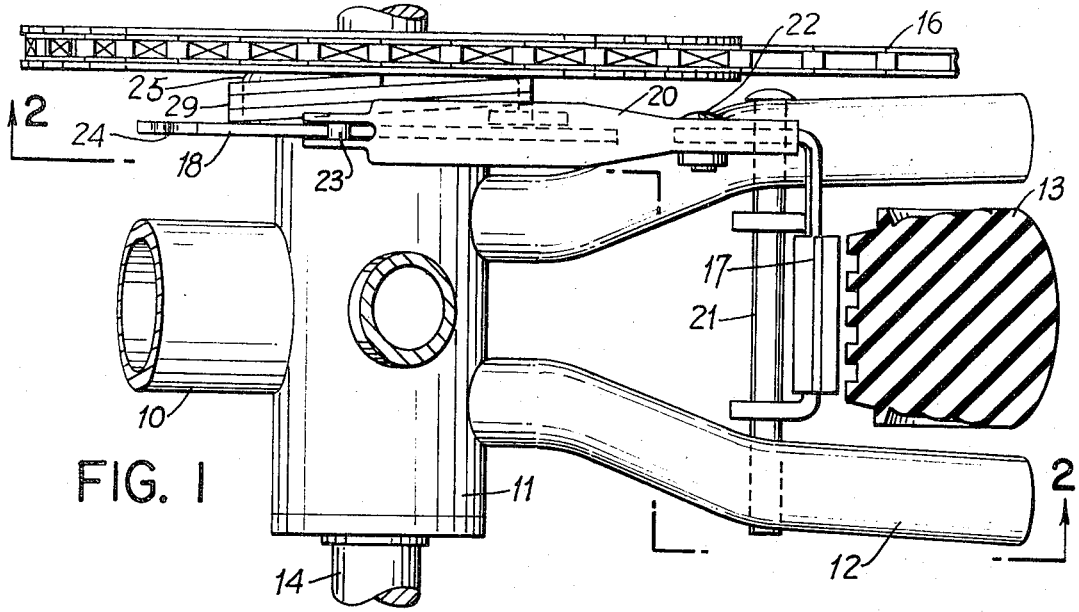
Figure 2:
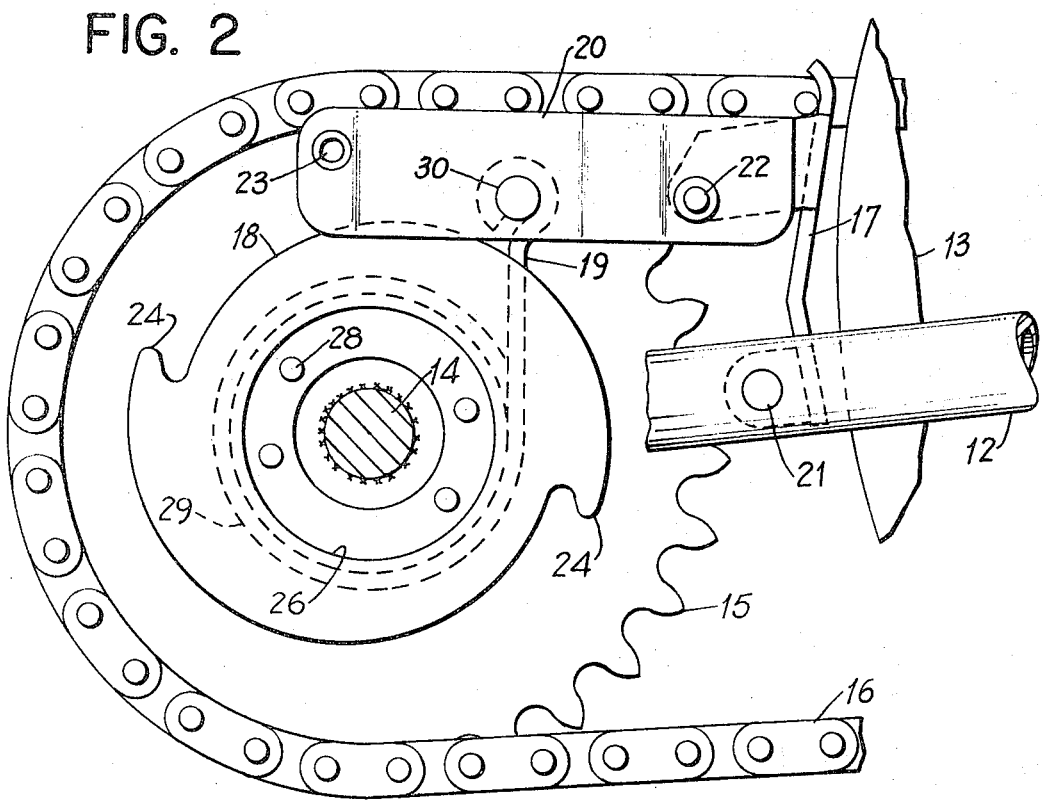

A preferred embodiment of the invention is illustrated in the drawing wherein FIG. 1 is a broken away top view of the invention, and FIG. 2 is a broken away side elevation view.

Only those bike parts are illustrated in the drawing which are necessary for an understanding of the invention. Briefly, shown therein are parts of the bike frame 10 such as the pedal hanger tube 11 and the bottom rear fork 12 for the rear wheel 13. A foot pedal crank 14 is journaled in the hanger 11 and is intended to rotate a sprocket 15 fixed to the crank 14. Sprocket 15 drives a chain 16 for purposes of driving rear wheel 13 in a manner well-known in the bike art.

The bike is caused to be stopped by a brake shoe 17 which is pivoted off the rear fork 12 and operated by means comprising a cam wheel 18, a spring 19, and a connecting link 20. More particularly, the brake shoe 17 is pivoted off the bottom rear fork 12 in front of rear wheel 13 by a pin 21 at the bottom end of the brake shoe. The connecting link 20 is generally U-shaped in cross section and at its rear end is pivotally connected to the upper end of the brake shoe by a pin 22. The front end of the link 20 straddles the cam wheel 18 and has a pin 23 which is intended to be engaged by lobes 24 on the cam 18 when the brake is energized, as will be described further hereinafter.

The cam wheel 18 is positioned between the hanger 11 and sprocket 15. Cam 18 has an integral collar 25 and end flange 26. End flange 26 is connected to the sprocket 15 by rivets 28 or the like so that collar 25 in effect is a spacer between the cam wheel 18 and sprocket 15.

Spring 19 is stiff and several turns 29 are positioned about the spacer collar 25 between the cam 18 and sprocket 15. The spring is loose on the collar 25. That is to say, it is not snug on the collar 25 so as to be grabbed or wound up by the collar 25 when the latter is rotating, but instead these two parts are free to slide with respect to each other.

The not shown end of the spring which is adjacent to the sprocket 15 is free or not fixed to anything, whereas the end of the spring 19 adjacent to the cam 18 comes up behind the collar 25 alongside the cam 18 and up into the central part of the link 20 and is pivotally connected thereto by a pin 30.

The lobes 24 are contoured so that when the crank 14 is pedalled forwardly or counterclockwise they will not engage the pin 23, but merely ride thereunder. In this direction of rotation, friction between the cam 18, collar 25, sprocket 15 and spring turns 29 will cause the spring to also turn in the same direction. Thus, the end of the spring 19 connected to the pin 30 lifts the link 20 and also moves it to the left. In this position of the link 20, which is shown in FIG. 2, the brake shoe 17 is moved to the left to be disengaged from the rear wheel 13 and the pin 23 is clear of the lobes 24. However, when the pedal crank is reversed, the brake shoe 17 is energized. That is to say, when the collar 25 is rotated in the opposite direction, the link 20 is no longer moved up and to the left, but is free to drop down for the lobes 24 to grab or engage the pin 23 to move the link 20 to the right to press the brake shoe 17 against the rear wheel 13 to brake stop the bike.

I claim:

1. A shoe brake for the rear wheel of a juvenile bike, comprising a brake shoe pivoted off the bike frame in front of the rear wheel, a cam wheel and spacer collar rotatable with a bike pedal crank, said cam wheel being positioned adjacent to a bike pedal hanger tube and being spaced from a bike sprocket by said collar, a link pivotally connected to said brake shoe and extending therefrom to said cam wheel, a pin on said link overlying said cam wheel and lobes on said cam wheel for engagement with said pin, and a spring for disengaging said pin from said lobes and said brake shoe from said rear wheel when pedalling forward, but allowing said lobes to engage said pin when reverse pedalling to engage said brake shoe with said rear wheel through said link, said spring being stiff and having several turns loose on said collar between said cam wheel and sprocket, and one end of said spring being disposed behind said collar alongside said cam wheel and being pivotally connected to said link between said pin and brake shoe.

* * * * *